(12) United States Patent
Kim et al.

(10) Patent No.: US 8,142,953 B2
(45) Date of Patent: Mar. 27, 2012

(54) HYDROPHILIC ADJUVANT

(75) Inventors: Dong Pyo Kim, Daejeon (KR); Lan Young Hong, Daejeon (KR); Jung Hye Won, Seoul (KR); Yong Su Park, Daejeon (KR); Chong Kyu Shin, Daejeon (KR)

(73) Assignee: LG Chem, Ltd., Seoul (KR)

( * ) Notice: Subject to any disclaimer, the term of this patent is extended or adjusted under 35 U.S.C. 154(b) by 904 days.

(21) Appl. No.: 12/086,519

(22) PCT Filed: Dec. 15, 2006

(86) PCT No.: PCT/KR2006/005496
§ 371 (c)(1),
(2), (4) Date: Jun. 13, 2008

(87) PCT Pub. No.: WO2007/069867
PCT Pub. Date: Jun. 21, 2007

(65) Prior Publication Data
US 2010/0167168 A1    Jul. 1, 2010

(30) Foreign Application Priority Data
Dec. 15, 2005 (KR) ................. 10-2005-0123594
Jul. 13, 2006 (KR) ................. 10-2006-0065736

(51) Int. Cl.
*H01M 8/10* (2006.01)
*C07F 7/02* (2006.01)
*B32B 1/08* (2006.01)
*C08G 79/00* (2006.01)

(52) U.S. Cl. ........... 429/495; 556/9; 556/173; 428/34.1; 428/9

(58) Field of Classification Search ........................ None
See application file for complete search history.

(56) References Cited

U.S. PATENT DOCUMENTS
5,997,621 A    12/1999    Scholz et al.

FOREIGN PATENT DOCUMENTS

| KR | 10-2000-0073475 | | 12/2000 |
|---|---|---|---|
| KR | 10-20000073475 | * | 9/2001 |
| KR | 10-2002-0034713 | | 5/2002 |
| KR | 10-2002-0042787 | | 6/2002 |
| WO | WO 03/035780 | | 5/2003 |

* cited by examiner

*Primary Examiner* — Melvin Mayes
*Assistant Examiner* — Yun Qian
(74) *Attorney, Agent, or Firm* — McKenna Long & Aldridge LLP

(57) ABSTRACT

Disclosed is an adjuvant capable of imparting a hydrophilic or superhydrophilic function to various materials or interfaces. The hydrophilic adjuvant comprises: a composite metal oxide containing Si and at least one metal element selected from the group consisting of Ti(IV), Zr(IV), Sn(IV) and Al(III); and a hydrophilic group-containing organic compound physically or chemically bonded with the Ti(IV), Zr(IV), Sn(IV) or Al of the composite metal oxide.

23 Claims, 4 Drawing Sheets

HYDROPHILIC ADJUVANT

This application claims the benefit of International Application Number PCT/KR/2006/005496 filed on Dec. 15, 2006 and Korean Application No. 10-2005-0123594 filed on Dec. 15, 2005 and Korean Application No. 10-2006-0065736 filed on Jul. 13, 2006, all of which are hereby incorporated by reference as if fully set forth herein.

TECHNICAL FIELD

The present invention relates to an adjuvant capable to imparting a hydrophilic or superhydrophilic function to various materials or interfaces. More particularly, the present invention relates to an adjuvant capable of imparting high hydrophilicity in order to exhibit an anti-fog effect or exhibit high fuel cell performance even in low humidity conditions.

BACKGROUND ART

When plastic and glass materials are exposed to an environment having a significantly different temperature and humidity, fog phenomena in which moisture is condensed on the surface of the materials in the form of fine water drops occur to rapidly reduce the transparency of the surface. For this reason, persons in spectacles suffer much inconvenience, particularly in the winter or summer season where the difference between indoor and outdoor temperatures is great. Also, in various fields, including bathroom mirrors, automobile glass and greenhouse glass, methods for imparting hydrophilicity to surfaces to prevent fog phenomena have been developed.

Currently commercialized liquid anti-fog agents are based on a liquid anionic surfactant, which, when applied to lens surfaces, shows a water contact angle of less than 10°. However, such anti-fog agents merely form a temporary layer in a physically adsorbed state rather than forming a permanent chemical bond with lens surfaces. Thus, these anti-fog agents are easily peeled off even by weak stimulation and can provide only temporary effects.

Recently, studies on functional coatings for preventing fog phenomena by chemically bonding lens surfaces with superhydrophobic fluorine compounds or compounds having hydrophilic groups have been actively conducted, but a technology of forming superhydrophilic thin films using metal ion chelates has not yet been developed.

Meanwhile, fuel cells, which is being received as next generation energy sources due to environment-friendly characteristics, use fuel gases (hydrogen, methanol, or other organic materials) and an oxidant (oxygen or air) and produce electric powder using electrons generated during oxidation/reduction reactions between the fuel gases and the oxidant. Such fuel cells comprise a continuous complex, which consists of a membrane electrode assembly (MEA) including a hydrogen ion exchange membrane interposed between an anode and a cathode, and a bipolar plate of collecting generated electricity and supplying fuel. In the anode, hydrogen or methanol as fuel is supplied and acts on an electrode catalyst to generate hydrogen ions (H+, protons), and in the cathode, hydrogen ions passed through the hydrogen ion exchange membrane bind to oxygen to produce pure water.

Each of the anode and the cathode consists of a catalyst layer, where oxidation/reduction reactions between reactants occur, and a support layer (also referred to as a gas diffusion layer) for supporting the catalyst layer. In addition to the role of supporting the catalyst layer, the support layer serves as a gas diffusion layer for diffusing reactants toward the catalyst layer, a collector for transferring electric currents generated in the catalyst layer to the bipolar plate, and a passage for discharging produced water out of the catalyst layer, and functions to cause a suitable amount of water to be present in the hydrogen ion exchange membrane.

A polymer electrolyte membrane fuel cell (PEMFC) that uses hydrogen as fuel in low humidity conditions can operate in a wide temperature range, and thus has advantages in that a cooling device is not required and sealing parts can be simplified. Also, it uses non-humidified hydrogen as fuel and thus does not require the use of a humidifier. In addition, it can be rapidly driven. Due to such advantages, it receives attention as a power source device for cars and homes. Furthermore, it is a high-output fuel cell having a current density higher than those of other types of fuel cells, which can operate in a wide temperature range and has a simple structure and rapid starting and response characteristics.

In the cases of sulfonated polymer electrolyte membranes, including perfluorosulfonated polymer Nafion, or hydrocarbons such as sulfonated polyether ether ketone, sulfonated polyethersulfone, sulfonated polystyrene, and sulfonated polyimide, a decrease in hydrogen ion conductivity resulting from a decrease in water content in the membranes occurs. For this reason, the use of these membranes at high temperatures (more than 100° C.) requires strict water control and complex systems.

In an attempt to solve the above-described problems, studies on various kinds of organic/inorganic composite electrolyte membranes, in which proton conducting fillers showing high hydrogen ion conductivity and water absorption are added to organic polymers, have been conducted. However, these membranes are not used in practice, because the performance thereof is reduced in low humidity conditions.

DISCLOSURE OF THE INVENTION

There is an urgent need to develop an adjuvant, which is durable, and at the same time, can impart high hydrophilicity, in order to exhibit an anti-fog effect or to exhibit high fuel cell performance even in low humidity conditions.

Accordingly, it is an object of the present invention to provide an adjuvant capable of imparting a hydrophilic or superhydrophilic function to various materials or interfaces.

The present invention provides a hydrophilic adjuvant comprising: a composite metal oxide containing Si and at least one metal element selected from the group consisting of Ti(IV), Zr(IV), Sn(IV) and Al(III); and a hydrophilic group-containing organic compound physically or chemically bonded with the Ti(IV), Zr(IV), Sn(IV) or Al of the composite metal oxide.

In one embodiment of the present invention, the composite metal oxide has a meso-porous structure, and preferably a hollow tubular meso-porous structure, in order to further enhance the property of imparting hydrophilicity. In this case, the hydrophilic group-containing organic compound is physically or chemically bonded inside the hollow of the composite metal oxide having the hollow tubular meso-porous structure.

In another aspect, the present invention provides a substrate having a coating layer formed using the hydrophilic adjuvant.

In still another aspect, the present invention provides an electrolyte membrane or a fuel cell electrode, which is formed using the hydrophilic adjuvant.

MODE FOR CARRYING OUT THE INVENTION

Hereinafter, the present invention will be described in detail.

Figure 1:
FIG. 1 shows a water contact angle.

Generally, properties such as superhydrophilicity, hydrophilicity, hydrophobicity, water repellency and super-water-repellency can be classified according to the contact angle of a water drop on a surface (see FIG. 1).

A water contact angle of less than 10° is classified as superhydrophilicity, a water contact angle of less than 30° as hydrophilicity, a water contact angle of 60-90° as hydrophobicity, a water contact angle of more than 90° as water repellency, and a water contact angle of more than 150° as super-water-repellency.

As used herein, the term "hydrophilicity" is meant to include not only hydrophilicity, but also superhydrophilicity.

1. Hydrophilic Adjuvant

The main components of the hydrophilic adjuvant according to the present invention are: a composite metal oxide containing Si and at least one metal element selected from the group consisting of Ti(IV), Zr(IV), Sn(IV) and Al(III); and a hydrophilic group-containing organic compound physically or chemically bonded with the Ti(IV), Zr(IV), Sn(IV) or Al of the composite metal oxide.

A. Composite Metal Oxide

In the present invention, the composite metal oxide containing Si and at least one metal oxide selected from the group consisting of Ti(IV), Zr(IV), Sn(IV) and Al(III) is an inorganic polymer having a network structure.

Silica or metal oxide itself also exhibits some hydrophilicity. However, as compared to a single component metal oxide such as silica, an at least two-component metal oxide, such as a composite metal oxide, containing Si and at least one metal element selected from the group consisting of Ti(IV), Zr(IV), Sn(IV) and Al(III), has high surface acidity, and thus high hydrophilicity and a high ability to support water adsorbed onto a surface because (Ti, Zr, Sn and Al) and Si have different oxidation numbers.

Meanwhile, the Ti(IV), Zr(IV), Sn(IV) or Al(III) of the composite metal oxide can be coordinated with ligands and can undergo bonding by electrostatic attraction, ionic bonding, physical adsorption and the like.

Thus, in order to enhance the hydrophilicity of the composite metal oxide having hydrophilicity, the hydrophilic group-containing organic compound can be physically or chemically bonded with the composite metal oxide.

Figure 3:
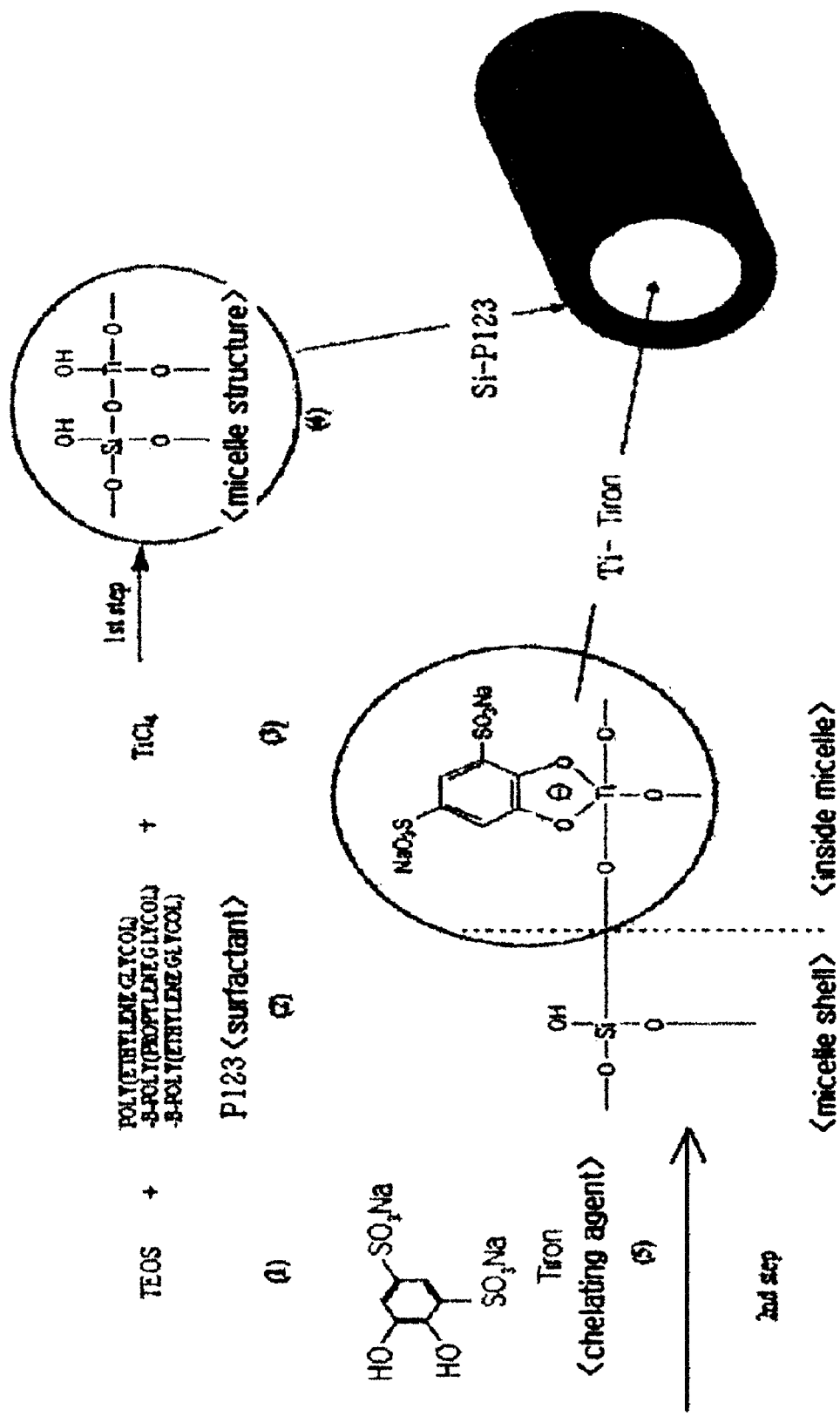
Figure 5:
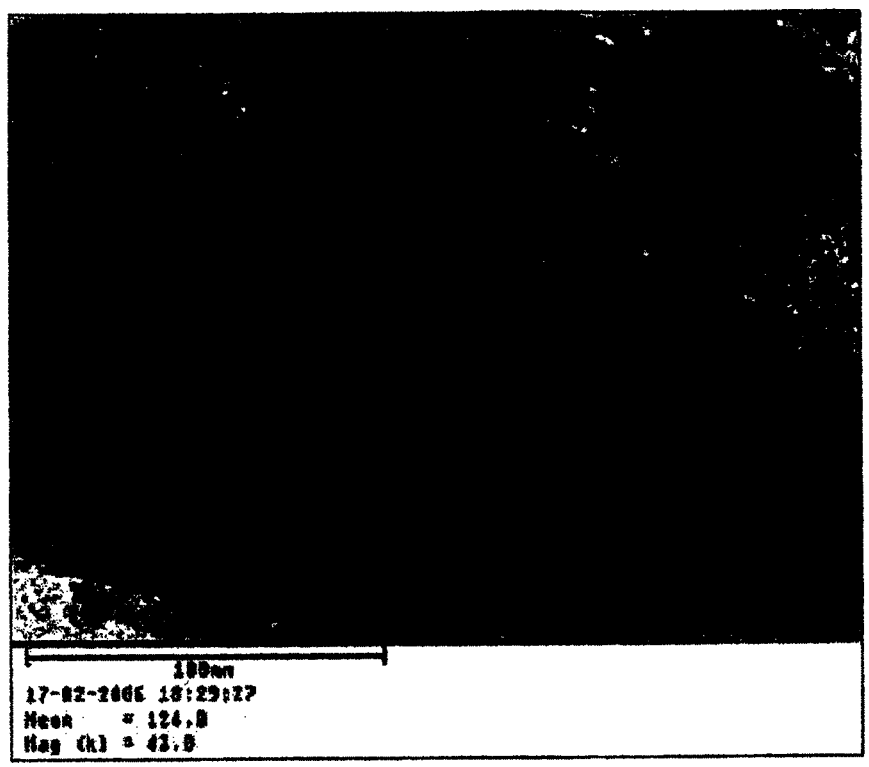
FIG. 5 is a TEM photograph of a hydrophilic adjuvant having a mesoporous structure according to the present invention.

Meanwhile, in a process of forming the composite metal oxide from a precursor solution by polymerization, when a surfactant is used, a micelle structure can be formed in the composite metal oxide, and furthermore, the composite metal oxide can have a hollow tubular meso-porous structure (see FIGS. 3 and 5).

The composite metal oxide having this structure has large surface area and a hollow structure capable of trapping water, and thus can further increase the hydrophilicity of the adjuvant. Also, because the surface area of the composite metal oxide is increased, the composite metal oxide can be largely bonded with the hydrophilic group-containing organic compound, and thus the hydrophilicity thereof can be maximized.

Herein, the silica moiety is present mainly in the micelle shell, and the metal oxide containing the Ti, Zr, Sn and/or Al metal element is present in the micelle. Thus, the hydrophilic group-containing organic compound can be physically or chemically bonded inside the hollow of the composite metal oxide having the hollow tubular meso-porous structure.

Meanwhile, the composite metal oxide in the hydrophilic adjuvant can also impart durability, mechanical stability and thermal stability to articles containing the hydrophilic adjuvant.

Also, when a Si—OH group exists on the surface of a substrate, such as a lens, to which the hydrophilic adjuvant according to the present invention is to be applied, there is an advantage in that the silica moiety of the composite metal oxide in the adjuvant can form a chemically strong interfacial bond with the Si—OH group.

The composite metal oxide can be formed by hydrolyzing a silane compound represented by Formula 1 to form a silica dispersion, adding a compound represented by Formula 2, or a mixture thereof, to the silica dispersion, and subjecting the resulting dispersion to a polymerization reaction, for example, a sol-gel reaction.

Alternatively, the composite metal oxide can also be formed through a polymerization reaction, for example, a sol-gel reaction, between the silane compound represented by Formula 1 and the compound represented by Formula 2 or a mixture thereof.

[Formula 1]

wherein R is independently selected from among $C_1$-$C_6$ alkoxy, hydroxy (OH) and halogen elements, n is an integer of 1-4, and R' is independently selected from among $C_1$-$C_6$ alkyl containing or not containing an unsaturated functional group, vinyl and hydrogen (H).

[Formula 2]

wherein A is Ti(IV), Zr(IV), Sn(IV) or Al(III), B is halogen, hydroxy (OH), $C_1$-$C_6$ alkoxy, or $C_5$-$C_{10}$ β-diketonate, a is 1 or 2, b is 4, 3 or 2, and c is 0 or 1.

To form silica ($SiO_2$) from the silane compound, a silica dispersion can be prepared by dissolving the silane compound in an organic solvent and adding a small amount of water and acid to the solution to hydrolyze the silane compound.

The composite metal oxide having the hollow tubular mesoporous structure can be formed by polymerizing a precursor(s) containing at least one element selected from the group consisting of Si, Ti(IV), Zr(IV), Sn(IV) and Al(III) in the presence of a solvent and a surfactant. A specific example thereof is shown in FIG. 3 and Example 1.

As the solvent, it is preferable to use a polar organic solvent, such as ethanol, water, isopropyl alcohol, methanol or ethyl acetate, and these solvents can be used alone or in a mixture.

The surfactant is preferably a nonionic surfactant represented by Formula 3, or an ionic surfactant represented by Formula 4.

[Formula 3]

wherein x=5-40%, y=90-20%, 2x+y=100%, EO is ethylene oxide, and PO is propylene oxide.

[Formula 4]

wherein n=12~18, and $X_1$=Cl or Br.

The surfactant of Formula 3 is a copolymer, and when the surfactant of Formula 3 is added, it is possible to induce the formation of an aligned porous structure and an increase in surface area.

B. Hydrophilic Group-Containing Organic Compound

In the present invention, the hydrophilic group-containing organic compound may be a substituted or unsubstituted $C_5$-$C_{30}$ aromatic compound or saturated or unsaturated aliphatic compound. The substituted or unsubstituted unsaturated aliphatic compound includes a polymer or copolymer thereof.

The hydrophilic group of the hydrophilic group-containing organic compound is preferably sulfonate salt, sulfonic acid, carboxylate salt, carboxylic acid, phosphate salt, phosphoric acid, hydroxy (OH), or a combination thereof.

For example, a sulfonate group acts to attract water due to strong hydrophilicity. Because of this water trapping, the sulfonate group is ionized into —$SO_3^-$ and $H^+$ by local hydration, so that the movement and transfer of hydrogen ions ($H^+$) can be smoothly achieved. Thus, when a hydrophilic adjuvant comprising an organic compound containing a hydrophilic group such as the sulfonate group is used in an electrolyte membrane, the hydrogen ion conductivity of the electrolyte membrane can be increased.

Also, the hydrophilic adjuvant according to the present invention can form stable hydrogen ion conducting channels through the mutual water trapping action of the hollow tubular meso-porous structure of the composite metal oxide and the hydrophilic group-containing organic compound bonded with the inside of the hollow, and thus can have excellent hydrogen ion conductivity in a wide range of temperature and humidity, particularly in conditions of high temperature and low humidity. In fact, it can be seen that the electrolyte membrane containing the hydrophilic adjuvant of the present invention shows excellent hydrogen ion conductivity in low humidity (40% relative humidity) compared to the prior Nafion membrane (see FIG. 6). Also, it can provide excellent chemical resistance and thermal stability.

Moreover, the sulfonated organic compound can exhibit superhydrophilicity together with the composite metal oxide, and thus the hydrophilic adjuvant according to the present invention can show an anti-fog effect by forming a superhydrophilic layer on a substrate surface.

The hydrophilic group-containing organic compound preferably has a functional group selected from the group consisting of hydroxy (OH), amine and phosphate groups, which are functional groups capable of forming a physical or chemical bond with Ti(IV), Zr(IV), Sn(IV) or Al of the composite metal oxide.

The hydrophilic group-containing organic compound is attached to the composite metal oxide through chemical bonds, for example coordination bonds, and thus can semi-permanently impart a hydrophilic function.

In particular, when the hydrophilic group-containing organic compound is a chelating agent, it is bonded with the Ti(IV), Zr(IV), Sn(IV) or Al of the composite metal oxide by coordination bond or electrostatic attraction, and thus it can form a hydrophilic adjuvant, which is semi-permanent and has excellent durability compared to the case of other bonds.

The chelating agent preferably has a dihydroxy group which can form a coordination bond with the Ti(IV), Zr(IV), Sn(IV) or Al of the composite metal oxide.

Preferred examples of the chelating agent include (OH)$_2$—R—(SO$_3$Na)$_2$ (wherein R is an aromatic hydrocarbon ring), for example

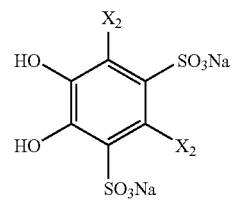

($X_2$ is H or $C_1$-$C_5$ hydrocarbon).

Non-limiting examples of the hydrophilic group-containing organic compound include disodium 1,2-dihydroxybenzene-3,5-disulfonate, sodium 1,2-dihydroxy-3-sulfonate, sodium 1,2-dihydroxy-4-sulfonate, sodium 1,2-dihydroxy-5-sulfonate, disodium 1,2-dihydroxy-4-chlorobenzene-3,5-disulfonate, disodium 1,2-dihydroxy-6-chlorobenzene-3,5-disulfonate, 1,2-dihydroxybenzene-3,5-disulfonic acid, 1,2-dihydroxy-3-sulfonic acid, 1,2-dihydroxy-4-sulfonic acid, 1,2-dihydroxy-5-sulfonic acid, 1,2-dihydroxy-4-chlorobenzene-3,5-disulfonic acid, 1,2-dihydroxy-6-chlorobenzene-3,5-disulfonic acid, disodium 1,2-dihydroxybenzene-3,5-dicarboxylate, sodium 1,2-dihydroxy-3-carboxylate, sodium 1,2-dihydroxy-4-carboxylate, sodium 1,2-dihydroxy-5-carboxylate, disodium 1,2-dihydroxy-4-chlorobenzene-3,5-dicarboxylate, disodium 1,2-dihydroxy-6-chlorobenzene-3,5-dicarboxylate, 1,2-dihydroxybenzene-3,5-dicarboxylic acid, 1,2-dihydroxy-3-carboxylic acid, 1,2-dihydroxy-4-carboxylic acid, 1,2-dihydroxy-5-carboxylic acid, 1,2-dihydroxy-4-chlorobenzene-3,5-dicarboxylic acid, 1,2-dihydroxy-6-chlorobenzene-3,5-dicarboxylic acid, disodium 1,2-dihydroxybenzene-3,5-diphosphate, sodium 1,2-dihydroxy-3-phosphate, sodium 1,2-dihydroxy-4-phosphate, sodium 1,2-dihydroxy-5-phosphate, disodium 1,2-dihydroxy-4-chlorobenzene-3,5-diphosphate, disodium 1,2-dihydroxy-6-chlorobenzene-3,5-diphosphate, 1,2-dihydroxybenzene-3,5-diphosphoric acid, 1,2-dihydroxybenzene-3-phosphoric acid, 1,2-dihydroxybenzene-4-phosphoric acid, 1,2-dihydroxybenzene-5-phosphoric acid, 1,2-dihydroxy-4-chlorobenzene-3,5-diphosphoric acid, 1,2-dihydroxy-6-chlorobenzene-3,5-diphosphoric acid, dihexadecyl phosphate, monododecylphosphate, Nafion (perfluorosulfonate ionomer; tetrafluoroethylene-perfluoro-3,6-dioxa-4-methyl-7-octenesulfonic acid copolymer), and mixtures thereof.

The hydrophilic adjuvant according to the present invention can be prepared by adding, to the silica dispersion, a precursor(s) containing at least one metal element selected from the group consisting of Ti(IV), Zr(IV), Sn(IV) and Al(III), and at the same time or thereafter, adding the hydrophilic group-containing organic compound according to the present invention.

FIG. 5 shows a TEM photograph of the inventive hydrophilic adjuvant, which comprises the composite metal oxide containing Si and at least one metal element selected from the group consisting of Ti(IV), Zr(IV), Sn(IV), Al(III), and the hydrophilic group-containing organic compound physically or chemically bonded with the Ti(IV), Zr(IV), Sn(IV) or Al of the composite metal oxide, and which has a mesoporous structure.

C. Silane Coupling Agent and Multifunctional Organic Compound

The hydrophilic adjuvant according to the present invention preferably further contains a silane coupling agent capable of reacting with the Si—OH of silica of the composite metal oxide (silica-metal oxide). In particular, the silane coupling agent is preferably UV-curable and heat-curable. The silane coupling agent can provide a further increase in surface adhesion.

Also, the hydrophilic adjuvant according to the present invention preferably further contain a UV- or heat-curable multifunctional organic compound in order to increase the interfacial adhesion, durability and mechanical stability of the composite metal oxide (silica-metal oxide).

Non-limiting examples of the silane coupling agent include compounds represented by Formula 5, or mixtures thereof.

$$(R^1(CH_2)_m)_d Si(OR^2)_{4-d}, \quad \text{[Formula 5]}$$

wherein m is an integer of 0-5, d is an integer of 1-3, $R^1$ is selected from among (meth)acrylate, vinyl, epoxy, amine, hydroxy, benzyl, phenyl and glycidoxypropyl, $R^2$ is $C_1$-$C_5$ hydrocarbon.

Examples of the multifunctional organic compound include compounds represented by Formula 6, and mixtures thereof.

$$R^3(EO)_k R^4 \quad \text{[Formula 6]}$$

wherein EO is ethylene oxide, k is an integer of 3-400, $R^3$ is selected from among OH, $C_1$-$C_{15}$ (meth)acrylate, $C_1$-$C_{15}$ di(meth)acrylate, $C_1$-$C_{15}$ tri(meth)acrylate and $C_1$-$C_{15}$ vinyl, and $R^4$ is selected from among hydrogen, $C_1$-$C_3$ (meth)acrylate and $C_1$-$C_3$ vinyl.

The compounds of Formula 6 can be exemplified by polyethylene glycol dimethacrylate, polyoxyethylene sorbitan monolaurate, polyethylene(10)isooctylcyclohexyl ether, ethoxylated(20) trimethoxypropane triacrylate, G2-5211 (methyl(propyl hydroxide, ethoxylated)bis(trimethyl siloxy) silane), and the like.

The silane coupling agent can be used to activate the bonding the Si—OH of silica of a ceramic layer and the Si—OH of surface silica, and the surface binding ability of the hydrophilic adjuvant can be significantly increased by inducing the binding of the functional group (vinyl group or acrylate group) of the multifunctional organic compound to the silane coupling agent. Also, the toughness of a ceramic layer can be increased by using the organic-inorganic mixture, thus increasing mechanical stability (see FIGS. 2 and 4).

Figure 2:
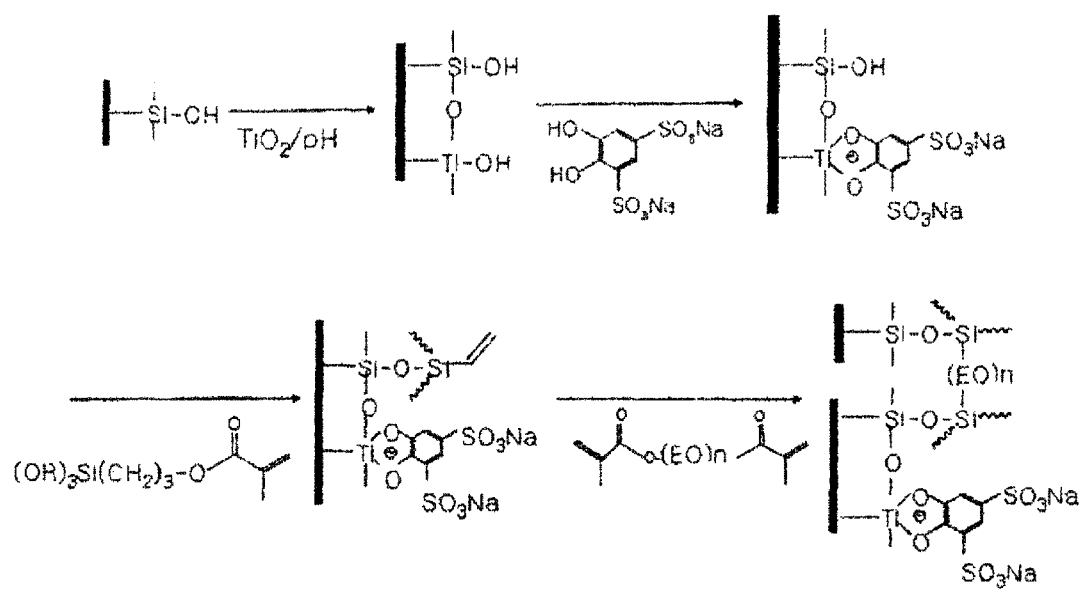
FIGS. 2 to 4 show a process of forming a hydrophilic adjuvant according to one embodiment of the present invention.
Figure 4:
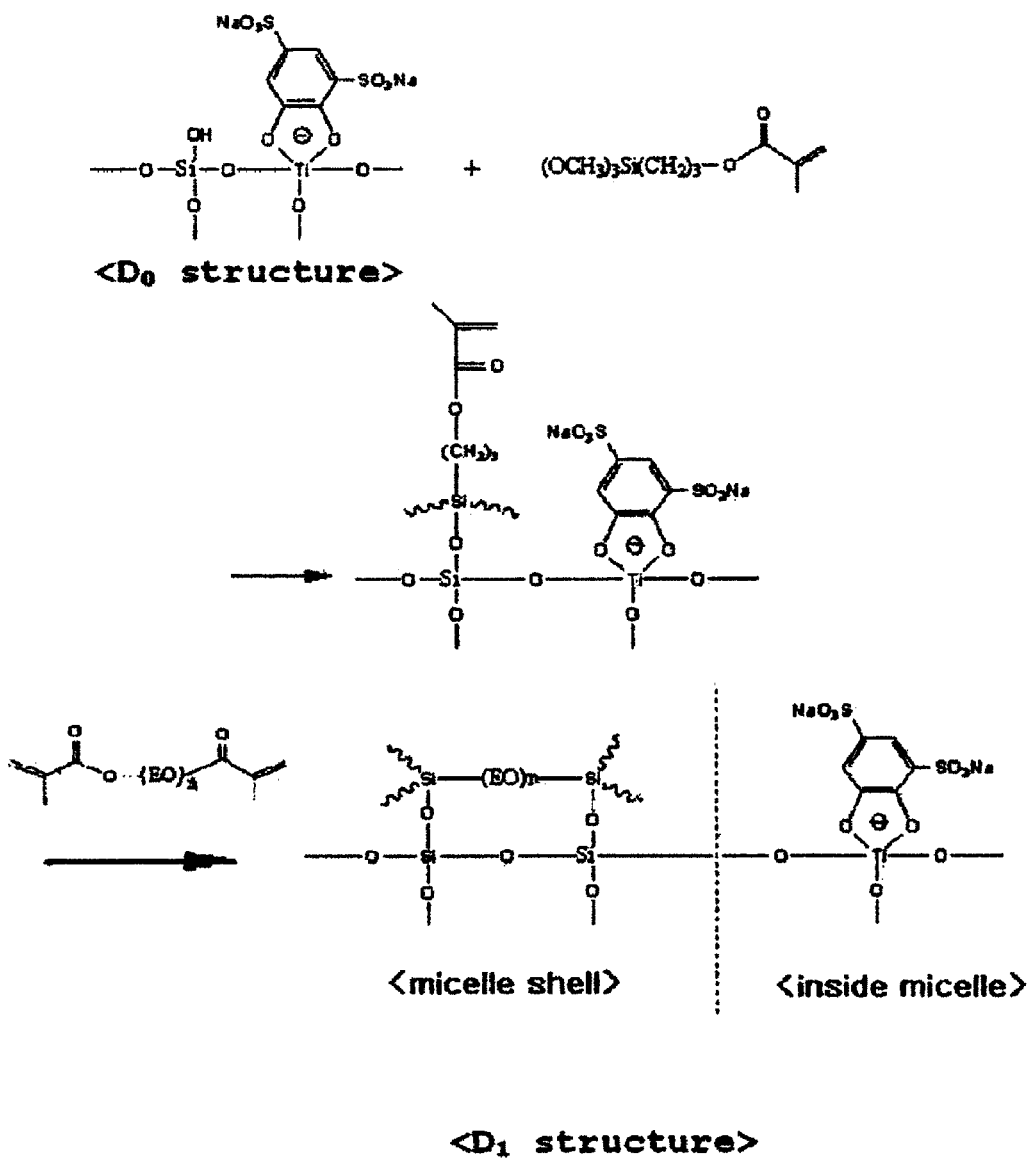

Although a silane coupling agent having a polymerizable functional group can be used to form a polymer, it is more preferable to form a copolymer of the silane coupling agent with the multifunctional organic compound in terms of the interfacial adhesion and durability of a coating layer formed using the inventive hydrophilic adjuvant (see FIGS. 2 and 4).

For example, the inventive hydrophilic adjuvant in a solution state can be formed into a polymer by adding the silane coupling agent thereto, and a copolymer of the reactive multifunctional organic compound with the silane coupling agent can also be formed by further adding the multifunctional organic compound during the formation of the polymer.

In a process of forming either a polymer of the silane coupling agent alone or a copolymer of the silane coupling agent with the multifunctional organic compound, at least one polymerization initiator selected from among dicumyl peroxide, benzoyl peroxide, AIBN (azobisbutyronitrile) and potassium persulfate can be added.

In one embodiment, the hydrophilic adjuvant according to the present invention has a mesoporous structure, which is presumed to be a structure in which silicon oxide, a surfactant (e.g., P123), the silane coupling agent and the multifunctional organic compound (e.g., a hydrophilic acrylate polymer) form the outer shell of a micelle, and metal oxide (e.g., titanium oxide) and a hydrophilic group-containing chelating agent (e.g., Tiron) are placed inside the micelle. After the hydrophilic adjuvant is subjected to a heat-curing or UV-curing process, it has the $D_1$ structure shown in FIG. 4.

2. Application of Hydrophilic Adjuvant

A. Hydrophilicity-Imparting Coating Solution

The hydrophilic adjuvant according to the present invention can be used as one component of a coating solution to be coated on a substrate. Herein, if the substrate is a porous substrate, the coating solution containing the hydrophilic adjuvant can also be coated on the pore surface of the substrate.

The coating solution containing the hydrophilic adjuvant according to the present invention can be applied on the substrate using conventional coating methods such as spin coating or dip coating, and the coating can be carried out one time or two times. After the coating process, the coating layer is cured through conventional heating and drying processes.

The substrate used in the present invention can be a plastic, glass or silicon substrate, but there is no limitation on the kind thereof. The substrate can be a glass or plastic substrate for cars, buildings or optics. The optical glass substrates include optical lenses. Also, the plastic substrate is made of, for example, PET (polyethyleneterephthalate), PC (polycarbonate), allyldiglycolcarbonate, or polymethylmethacrylate.

Also, it is possible to carry out a pretreatment process of coating a partially hydrated alkoxy silane compound on the substrate surface to increase the Si—OH density of the substrate surface.

A substrate having a coating layer formed using the hydrophilic adjuvant according to the present invention has increased hydrophilicity and can have a controlled water contact angle of less than 10°, leading to anti-fog performance.

Meanwhile, in the hydrophilic adjuvant according to the present invention, it is possible to control physical properties, such as hydrophilicity and miscibility, by controlling the ratio between the inorganic component and the organic component. Also, when nanosized regular fine patterns are imprinted on the surface of the coating layer formed using the hydrophilic adjuvant according to the present invention, the water contact angle thereof is changed to a maximum of 80°. Thus, functionalities such as hydrophilicity and adsorptivity can be selectively designed and imparted by controlling the surface of a specific fine region in the above manner.

B. Fuel Cell

The hydrophilic adjuvant according to the present invention can impart hydrophilicity to the substrate on which it is applied. Thus, it can be used as one component of a fuel cell electrolyte membrane or electrode requiring hydrophilicity to increase hydrogen ion conductivity, thus modifying the hydrophilicity and hydrogen ion conductivity characteristics of the membrane or electrode.

(1) Electrolyte Membrane

The hydrophilic adjuvant according to the present invention can be used as one component of a film-forming formulation in a process of forming a film. The film can also be formed only of the hydrophilic adjuvant.

For example, the hydrophilic adjuvant according to the present invention can be used as one component of a coating solution for forming an electrolyte membrane or as one component of an electrolyte membrane-forming formulation, to prepare an electrolyte membrane, for example, an electrolyte membrane for fuel cells.

Specifically, the hydrophilic adjuvant-containing solution in the organic polymer solution can be used in an amount of 0.1-1000 wt %, and preferably 1-100 wt %, based on the content of the organic polymer.

Non-limiting examples of the organic polymer include PTFE (polytetrafluoroethylene), PVDF (polyvinylidenefluoride) Nafion, PA (polyamide), PI (polyimide), PVA (polyvinylalcohol), polyazole, PAE (polyarylenether), and polyether ether ketone (PEEK). Preferably, sulfonated polyether ether ketone may be used in the present invention. In the case of an organic/inorganic composite electrolyte membrane containing the hydrophilic adjuvant according to the present invention, a crosslinking reaction can be induced through heat curing or UV curing after the fabrication of the membrane.

The electrolyte membrane can be fabricated by coating and drying an electrolyte membrane-forming composite coating solution containing the inventive hydrophilic adjuvant on a substrate, and by separating the resulting membrane from the substrate. Non-limiting examples of the substrate include glass plates, polymer films, stainless plates, Teflon sheets and the like.

The coating solution can be coated on the substrate using conventional methods known in the art, for example, dip coating, die coating, roll coating, comma coating, doctor blading, or combinations thereof.

The performance of fuel cells was measured using a composite electrolyte membrane to which the hydrophilic adjuvant according to the present invention was applied. As a result, it could be seen that the composite electrolyte membrane showed improved performance in conditions of low humidity and atmospheric pressure compared to a pure organic polymer electrolyte membrane (see FIG. 6).

(2) Electrode

In a process of fabricating a fuel cell electrode comprising a noble metal catalyst, the electrode can be fabricated by stirring the inventive hydrophilic adjuvant together with a catalyst, a polymer electrolyte solution, distilled water, IPA (isopropylalcohol) and the like, and then by applying the stirred solution on a gas diffusion layer (GDL), such as carbon cloth or carbon paper. Herein, the hydrophilic adjuvant-containing solution can be used in an amount of 0.1-1000 wt %, and preferably 1-100 wt %, based on the content of the polymer in the electrolyte solution.

(3) Membrane-Electrode Assembly

A membrane-electrode assembly for fuel cells has a structure in which an anodic catalyst layer and a cathodic catalyst layer are in contact with an electrolyte membrane. The membrane-electrode assembly can be fabricated using the inventive electrolyte membrane, the inventive electrode, or both.

Hereinafter, the present invention will be described in further detail with reference to examples. It is to be understood, however, that these examples are illustrative only, and the scope of the present invention is not limited thereto.

Example 1

Preparation of Hydrophilic Adjuvant 1

100 g of ethanol was mixed with 100 g of TEOS (tetraethyl orthosilicate; $Si(OCH_2CH_3)_4$), and 50 g of water ($H_2O$) and 5 ml of HCl were added thereto. The mixture was allowed to react for about 30 minutes, and 57.5 g of Pluronic P123 (ethylene oxide/propylene oxide block copolymer, Mn-5800) in ethanol was added to the reaction solution, thus preparing a silica solution.

A solution of 7 ml of titanium chloride ($TiCl_4$) in 50 g of water was added to the silica solution, and 5 g of Tiron (4,5-dihydroxy-m-benzenedisulfonic acid, disodium salt) was added thereto, thus preparing a Si—Ti composite metal oxide solution (hydrophilic adjuvant 1). The molar ratio of Ti/Si was 1/10.

Example 2

Preparation of Hydrophilic Adjuvant 2

The hydrophilic adjuvant 1 prepared in Example 1 was mixed with 10 g of MPTMS (methacryloxypropyl trimethoxysilane), 10 g of polyethylene glycol dimethacrylate and 0.7 g of thermal initiator dicumyl peroxide, and the mixture was allowed to react for 30 minutes, thus preparing hydrophilic adjuvant 2 having enhanced adhesion.

Example 3

Preparation of Hydrophilic Adjuvant 3

The same silica solution as prepared in Example 1 was mixed with 15 g of zirconium chloride ($ZrCl_4$) dissolved in water, and 5.0 g of Tiron was added thereto, thus preparing a Si—Zr composite metal oxide solution.

The Si—Zr composite metal oxide solution was mixed with 10 g of MPTMS and 10 g of polyethylene glycol dimethacrylate, and the mixture was allowed to react, thus preparing hydrophilic adjuvant 3 having enhanced adhesion.

Example 4

Preparation of Hydrophilic Adjuvant 4

The same silica solution as prepared in Example 1 was mixed with 22 g of tin chloride (IV)($SnCl_4$) dissolved in water, and 5.0 g of Tiron was added thereto, thus preparing a Si—Sn composite metal oxide solution.

The Si—Sn composite metal oxide solution was mixed with 10 g of MPTMS and 10 g of polyethylene glycol dimethacrylate, and the mixture was allowed to react, thus preparing hydrophilic adjuvant 4 having enhanced adhesion.

Example 5

Preparation of Hydrophilic Adjuvant 5

The same silica solution as prepared in Example 1 was mixed with 9 g of aluminum (III) chloride hydrate ($AlCl_3$) dissolved in water, and 5.0 g of Tiron was added thereto, thus preparing a Si—Al composite metal oxide solution.

The Si—Al composite metal oxide solution was mixed with 10 g of MPTMS and 10 g of polyethylene glycol dimethacrylate, and the mixture was allowed to react, thus preparing hydrophilic adjuvant 5 having enhanced adhesion.

Example 6

Preparation of Hydrophilic Adjuvant 6

The same silica solution as prepared in Example 1 was mixed with 4 ml of titanium chloride ($TiCl_4$) dissolved in water, and 5.0 g of Nafion (perfluorosulfonate ionomer; tetrafluoroethylene-perfluoro-3,6-dioxa-4-methyl-7-octenesulfonic acid copolymer) was added thereto, thus preparing a Si—Ti composite metal oxide solution.

The Si—Ti composite metal oxide solution was 10 g of MPTMS, 10 g of polyethylene glycol dimethacrylate and 0.7 g of thermal initiator dicumyl peroxide, and the mixture was allowed to react for 30 minutes, thus preparing hydrophilic adjuvant 6 having enhanced adhesion.

Example 7

Preparation of Hydrophilic Adjuvant 7

The same silica solution as prepared in Example 1 was mixed with 15 g of zirconium chloride ($ZrCl_4$) dissolved in water, and 5.0 g of Nafion was added thereto, thus preparing a Si—Zr composite metal oxide solution.

The Si—Zr composite metal oxide solution was mixed with 10 g of MPTMS and 10 g of polyethylene glycol dimethacrylate, and the mixture was allowed to react, thus preparing hydrophilic adjuvant 7 having enhanced adhesion.

Example 8

Preparation of Hydrophilic Adjuvant 8

The same silica solution as prepared in Example 1 was mixed with 22 g of tin (IV) chloride ($SnCl_4$) dissolved in water, and 5.0 g of Nafion was added thereto, thus preparing a Si—Sn composite metal oxide solution.

The Si—Sn composite metal oxide solution was mixed with 10 g of MPTMS and 10 g of polyethylene glycol dimethacrylate, and the mixture was allowed to react, thus preparing hydrophilic adjuvant 8 having enhanced adhesion.

Example 9

Preparation of Hydrophilic Adjuvant 9

The same silica solution as prepared in Example 1 was mixed with 9 g of aluminum (III) chloride hydrate ($AlCl_3$) dissolved in water, and 5.0 g of Nafion was added thereto, thus preparing a Si—Al composite metal oxide solution.

The Si—Al composite metal oxide solution was mixed with 10 g of MPTMS and 10 g of polyethylene glycol dimethacrylate, and the mixture was allowed to react, thus preparing hydrophilic adjuvant 9 having enhanced adhesion.

Example 10

Preparation of Hydrophilic Adjuvant 10

The same silica solution as prepared in Example 1 was mixed with 15 ml of titanium (IV) ethoxide ($Ti(OC_2H_5)_4$) dissolved in water, and 5.0 g of Tiron was added thereto, thus preparing a Si—Ti composite metal oxide solution.

The Si—Ti composite metal oxide solution was mixed with 10 g of MPTMS and 10 g of polyethylene glycol dimethacrylate, and the mixture was allowed to react, thus preparing hydrophilic adjuvant 10 having enhanced adhesion.

Example 11

Preparation of Hydrophilic Adjuvant 11

The same silica solution as prepared in Example 1 was mixed with 4 ml of titanium chloride ($TiCl_4$) dissolved in water, and 5.0 g of Tiron was added thereto, thus preparing a Si—Ti composite metal oxide solution.

The Si—Ti composite metal oxide solution was mixed with 10 g of MPTMS and 10 g of sodium dodecyl sulfate, and the mixture was allowed to react, thus preparing hydrophilic adjuvant 11 having enhanced adhesion.

Example 12

Preparation of Hydrophilic Adjuvant 12

The same Si—Ti composite metal oxide solution as prepared in Example 11 was mixed with 10 g of MPTMS and 10 g of polyethylene sorbitan monolaurate, and the mixture was allowed to react, thus preparing hydrophilic adjuvant 12 having enhanced adhesion.

Example 13

Preparation of Hydrophilic Adjuvant 13

The same Si—Ti composite metal oxide solution as prepared in Example 11 was mixed with 10 g of MPTMS and 10 g of polyethylene(10)isooctylcyclohexyl ether, and the mixture was allowed to react, thus preparing hydrophilic adjuvant 13 having enhanced adhesion.

Example 14

Preparation of Hydrophilic Adjuvant 14

The same Si—Ti composite metal oxide solution as prepared in Example 11 was mixed with 10 g of MPTMS and 10 g of ethoxylated(20) trimethoxypropane triacrylate, and the mixture was allowed to react, thus preparing hydrophilic adjuvant 14 having enhanced adhesion.

Example 15

Preparation of Hydrophilic Adjuvant 15

The same Si—Ti composite metal oxide solution as prepared in Example 11 was mixed with 10 g of MPTMS and 10 g of G2-5211 (methyl(propyl hydroxide, ethoxylated)bis(trimethyl siloxy)silane), and the mixture was allowed to react, thus preparing hydrophilic adjuvant 15.

Example 16

Preparation of Hydrophilic Adjuvant 16

Hydrophilic adjuvant 16 having enhanced adhesion was prepared in the same manner as in Example 2, except that dicumyl peroxide was not used.

Measurement of Water Contact Angle

A polycarbonate lens (water contact angle of 80°) was dip-coated with the hydrophilic adjuvant 1 in a solution state at room temperature and then dried in a vacuum oven at 50° C. for 24 hours. Then, the polycarbonate lens was dried by heating at 110° C. for 8 hours, thus manufacturing a coated lens.

A coating layer was formed on a coating object using each of the hydrophilic adjuvant solutions prepared in Examples 2-15, according to coating methods and drying conditions shown in Table 1 below.

Meanwhile, after the coating layer was formed using each of the hydrophilic adjuvant solutions, the water contact angle of the coating layer was measured with a contact angle goniometry (PSA 100, KRUSS GmbH), with the measurement results shown in Table 1. Water drops were dropped onto a measurement surface with a 2-μl microinjector. The contact angles of five water drops on the measurement surface were measured with a microscope and taken as the average value of the measured water contact angles.

TABLE 1

| Hydrophilic adjuvant | Object to be coated | Coating method | Drying | Water contact angle |
|---|---|---|---|---|
| Example 1 | Polycarbonate lens | Dip coating at RT | Drying in vacuum oven at 50° C. for 24 hours, and then drying by heating at 110° C. for 8 hours | 7° |
| Example 2 | Polycarbonate lens | Dip coating at RT | Drying in vacuum oven at 60° C. for 24 hours, and then drying by heating at 100° C. for 30 minutes | 13° |
| Example 3 | Silicon wafer | Coating | Drying in vacuum oven at 60° C. for 24 hours, and then drying by heating at 100° C. for 30 minutes | 18° |
| Example 4 | Glass substrate | Dip coating | Drying in vacuum oven at 60° C. for 24 hours, and then drying by heating at 100° C. for 30 minutes | 18° |
| Example 5 | PET substrate | Dip coating | Drying in vacuum oven at 60° C. for 24 hours, and then drying by heating at 100° C. for 30 minutes | 18° |
| Example 6 | Polycarbonate lens | Dip coating at RT | Drying in vacuum oven at 60° C. for 24 hours, and then drying by heating at 100° C. for 30 minutes | — |
| Example 7 | Polycarbonate substrate | Coating | Drying in vacuum oven at 60° C. for 24 hours, and then drying by heating at 100° C. for 30 minutes | — |
| Example 8 | Glass substrate | Dip coating | Drying in vacuum oven at 60° C. for 24 hours, and then drying by heating at 100° C. for 30 minutes | — |
| Example 9 | Silicon wafer | Dip coating | Drying in vacuum oven at 60° C. for 24 hours, and then drying by heating at 100° C. for 30 minutes | — |
| Example 10 | PET substrate | Dip coating | Drying in vacuum oven at 60° C. for 24 hours, and then drying by heating at 100° C. for 30 minutes | 15° |
| Example 11 | Polycarbonate substrate | Dip coating | Drying in vacuum oven at 60° C. for 24 hours, and then drying by heating at 100° C. for 30 minutes | 15° |
| Example 12 | Silicon wafer | Dip coating | Drying in vacuum oven at 60° C. for 24 hours, and then drying by heating at 100° C. for 30 minutes | 14° |
| Example 13 | glass substrate | Dip coating at RT | Drying in vacuum oven at 60° C. for 24 hours, and then drying by heating at 100° C. for 30 minutes | 13° |
| Example 14 | PET substrate | Dip coating at RT | Drying in vacuum oven at 60° C. for 24 hours, and then drying by heating at 100° C. for 30 minutes | 13° |
| Example 15 | Polycarbonate substrate | Dip coating | Drying in vacuum oven at 60° C. for 24 hours, and then drying by heating at 100° C. for 30 minutes | 13° |

As can be seen in Table 1 above, the substrates having the hydrophilic adjuvant applied thereon showed a reduction in water contact angle, and thus had improved hydrophilic properties.

Example 17

Preparation of Organic/Inorganic Composite Electrolyte Membrane (Sample 1) Containing Hydrophilic Adjuvant 1 and Sulfonated Polyether Ether Ketone 1 g of a 40 wt % solution of the hydrophilic adjuvant 1 prepared in Example 1 was added to 40 g of a solution of sulfonated polyether ether ketone dissolved in DMAC at a concentration of 10 wt %, to prepare a composite solution, and the composite solution was prepared into a film using a solution pouring method. For this purpose, the composite solution was poured onto a glass plate as a support and then applied to a given thickness using a doctor blade. The applied glass plate was stored in a constant temperature and humidity chamber at 80° C. for about 8 hours to spread the solution, thus preparing the film. Finally, the formed film was separated from the support. The film was stirred in 1 M sulfuric acid at 80° C. for 2 hours, and then washed with distilled water, thus preparing organic/inorganic composite electrolyte membrane sample 1 containing the hydrophilic adjuvant 1 and sulfonated polyether ether ketone.

Example 18

Preparation of Organic/Inorganic Composite Electrolyte Membrane (Sample 2) Containing Hydrophilic Adjuvant 16 and Sulfonated Polyether Ether Ketone 1 g of a 40 wt % solution of the hydrophilic adjuvant 16 prepared in Example 16 was added to 40 g of a solution of sulfonated polyether ether ketone dissolved in DMAC at a concentration of 40 wt %, to prepare a composite solution. The composite solution was mixed with 0.7 g of thermal inhibitor dicumyl peroxide or 0.7 of a photoinitiator (I369), and the mixture was formed into a film using a solution pouring method. For this purpose, the composite solution was poured on a glass plate as a support, and then applied to a given thickness using a doctor blade. The applied glass plate was stored in a constant temperature and humidity chamber at 80° C. for about 8 hours to spread the solution, and then the spread solution was crosslinked by heating to 100° C. or UV-cured by UV irradiation (1 J/cm², 20 mW/cm² @ 365 nm, 50 sec). Finally, the formed film was separated from the support. The separated film was stirred in 1 M sulfuric acid at 80° C. for 2 hours and then washed with distilled water, thus preparing organic/inorganic composite electrolyte membrane sample 2 containing the hydrophilic adjuvant 16 and sulfonated polyether ether ketone.

Comparative Example 1

Preparation of Electrolyte Membrane (Sample 3) Containing Sulfonated Polyether Ether Ketone Electrolyte membrane sample 3 was prepared in the same manner as in Example 17, except that the hydrophilic adjuvant 1 was not used.

Example 19

Preparation of Electrode Containing Hydrophilic Electrode

The hydrophilic adjuvant 1 solution prepared in Example 1 or the hydrophilic adjuvant solution 2 prepared in Example 2, a catalyst (Pt/C), distilled water, a sulfonated polyether ether ketone electrolyte solution (5%), and IPA (isopropylalcohol) were mixed with each other at a ratio of Pt/C:H$_2$O:5% ionomer solution: hydrophilic adjuvant solution:IPA=1:3:6:1: 100, followed by stirring. The stirred mixture was applied onto carbon cloth, thus preparing an electrode.

Fuel Cell Performance

The electrolyte membranes (samples 1, 2 and 3) prepared in Examples 17 and 18 and Comparative Example 1 were used to unit cells as membrane-electrode assemblies (MEA). The performance of the cells was tested.

Figure 6:
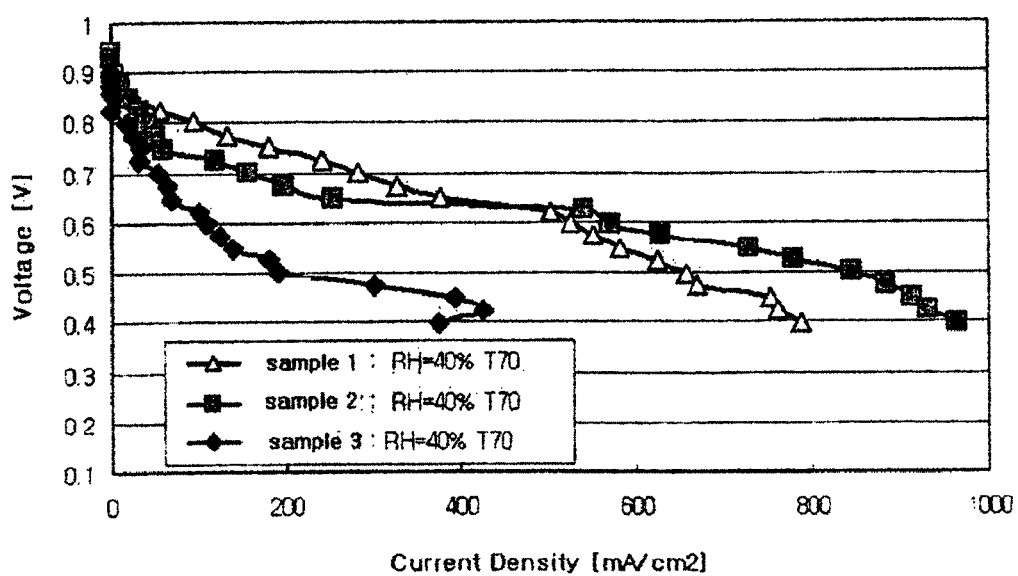
FIG. 6 is a graphic diagram showing the performance of fuel cells including electrolyte membranes prepared in Examples 17 and 18 and Comparative Example 1.

The performance tests were carried out using a PEMFC test station system (Arbin) in the following conditions: a cell temperature of 70° C., a cell effective area of 25 cm², a hydrogen flow rate of 200 cc/m, and an air flow rate of 1000 cc/m. The cells were operated in atmospheric conditions, and the cell performance was examined in a relative humidity condition of 40% while changing the temperature of a humidifier. The results of cell performance tests conducted in low humidity conditions are shown in FIG. 6. As can be seen in FIG. 6, the fuel cells comprising the membrane-electrode assembly consisting of the organic/inorganic composite electrolyte membrane and electrode showed high fuel cell performance in low humidity conditions compared to the general electrolyte membrane.

INDUSTRIAL APPLICABILITY

As can be seen from the foregoing, a substrate coated with the hydrophilic adjuvant according to the present invention can exhibit superhydrophlilicity, and thus show an antifog effect. Also, an electrolyte membrane and/or electrode including the hydrophilic adjuvant according to the present invention can improve fuel cell performance even in low humidity conditions due to increased hydrophilicity and hydrogen ion conductivity.

Although the preferred embodiment of the present invention has been described for illustrative purposes, those skilled in the art will appreciate that various modifications, additions and substitutions are possible, without departing from the scope and spirit of the invention as disclosed in the accompanying claims.

The invention claimed is:

1. A hydrophilic adjuvant comprising:
a composite metal oxide containing Si and at least one metal element selected from the group consisting of Ti(IV), Zr(IV), Sn(IV) and Al(III); and
a hydrophilic group-containing organic compound physically or chemically bonded with the Ti(IV), Zr(IV), Sn(IV) or Al of the composite metal oxide,
wherein the composite metal oxide has a meso-porous structure.

2. The hydrophilic adjuvant of claim 1, wherein the composite metal oxide has a hollow tubular meso-porous structure.

3. The hydrophilic adjuvant of claim 2, wherein the hydrophilic group-containing organic compound is physically or chemically bonded inside the hollow of the composite metal oxide having the hollow tubular meso-porous structure.

4. The hydrophilic adjuvant of claim 2, wherein the silane coupling agent is a compound represented by Formula 5, or a mixture thereof:

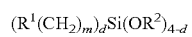 [Formula 5]

wherein m is an integer of 0-5, d is an integer of 1-3, R$^1$ is selected from among (meth)acrylate, vinyl, epoxy, amine, hydroxy, benzyl, phenyl and glycidoxypropyl, R$^2$ is C$_1$-C$_5$ hydrocarbon.

5. The hydrophilic adjuvant of claim 1, wherein the hydrophilic group of the hydrophilic group-containing organic compound is selected from the group consisting of sulfonate salt, sulfonic acid, carboxylate salt, carboxylic acid, phosphate salt, phosphoric acid and hydroxy (OH).

6. The hydrophilic adjuvant of claim 1, wherein the hydrophilic group-containing organic compound contains a functional group selected from the group consisting of hydroxy (OH), amine and phosphate, which are functional groups capable of forming a physical or chemical bond with the Ti(IV), Zr(IV), Sn(IV) or Al of the composite metal oxide.

7. The hydrophilic adjuvant of claim 1, wherein the hydrophilic group-containing organic compound is a chelating agent capable of forming a coordination bond with the Ti(IV), Zr(IV), Sn(IV) or Al of the composite metal oxide.

8. The hydrophilic adjuvant of claim 1, wherein the hydrophilic group-containing organic compound is selected from the group consisting of disodium 1,2-dihydroxybenzene-3,5-disulfonate, sodium 1,2-dihydroxy-3-sulfonate, sodium 1,2-dihydroxy-4-sulfonate, sodium 1,2-dihydroxy-5-sulfonate, disodium 1,2-dihydroxy-4-chlorobenzene-3,5-disulfonate, disodium 1,2-dihydroxy-6-chlorobenzene-3,5-disulfonate, 1,2-dihydroxybenzene-3,5-disulfonic acid, 1,2-dihydroxy-3-sulfonic acid, 1,2-dihydroxy-4-sulfonic acid, 1,2-dihydroxy-5-sulfonic acid, 1,2-dihydroxy-4-chlorobenzene-3,5-disulfonic acid, 1,2-dihydroxy-6-chlorobenzene-3,5-disulfonic acid, disodium 1,2-dihydroxybenzene-3,5-dicarboxylate, sodium 1,2-dihydroxy-3-carboxylate, sodium 1,2-dihydroxy-4-carboxylate, sodium 1,2-dihydroxy-5-carboxylate, disodium 1,2-dihydroxy-4-chlorobenzene-3,5-dicarboxylate, disodium 1,2-dihydroxy-6-chlorobenzene-3,5-dicarboxylate, 1,2-dihydroxybenzene-3,5-dicarboxylic acid, 1,2-dihydroxy-3-carboxylic acid, 1,2-dihydroxy-4-carboxylic acid, 1,2-dihydroxy-5-carboxylic acid, 1,2-dihydroxy-4-chlorobenzene-3,5-dicarboxylic acid, 1,2-dihydroxy-6-chlorobenzene-3,5-dicarboxylic acid, disodium 1,2-dihydroxybenzene-3,5-diphosphate, sodium 1,2-dihydroxy-3-phosphate, sodium 1,2-dihydroxy-4-phosphate, sodium 1,2-dihydroxy-5-phosphate, disodium 1,2-dihydroxy-4-chlorobenzene-3,5-diphosphate, disodium 1,2-dihydroxy-6-chlorobenzene-3,5-diphosphate, 1,2-dihydroxybenzene-3,5-diphosphoric acid, 1,2-dihydroxybenzene-3-phosphoric acid, 1,2-dihydroxybenzene-4-phosphoric acid, 1,2-dihydroxybenzene-5-phosphoric acid, 1,2-dihydroxy-4-chlorobenzene-3,5-diphosphoric acid, 1,2-dihydroxy-6-chlorobenzene-3,5-diphosphoric acid, dihexadecyl phosphate, monododecylphosphate, and Nafion (tetrafluoroethylene-perfluoro-3,6-dioxa-4-methyl-7-octenesulfonic acid copolymer).

9. The hydrophilic adjuvant of claim 1, wherein the composite metal oxide is formed by:
(1) hydrolyzing a silane compound represented by Formula 1 to form a silica dispersion, adding thereto a compound represented by Formula 2, or a mixture thereof, and subjecting the resulting dispersion to a polymerization reaction; or
(2) polymerizing the silane compound represented by Formula 1 with the compound represented by Formula 2, or a mixture thereof:

$$R'_{4-n}SiR_n \quad \text{[Formula 1]}$$

wherein R is independently selected from among $C_1$-$C_6$ alkoxy, hydroxy (OH) and halogen elements, n is an integer of 1-4, and R' is independently selected from among $C_1$-$C_6$ alkyl containing or not containing an unsaturated functional group, vinyl and hydrogen (H); and $$A_aB_bO_c \quad \text{[Formula 2]}$$

wherein A is Ti(IV), Zr(IV), Sn(IV) or Al(III), B is halogen, hydroxy (OH), $C_1$-$C_6$ alkoxy, or $C_5$-$C_{10}$ β-diketonate, a is 1 or 2, b is 4, 3 or 2, and c is 0 or 1.

10. The hydrophilic adjuvant of claim 1, wherein the composite metal oxide having the mesoporous structure is formed by polymerizing a precursor(s) containing at least one element selected from the group consisting of Si, Ti(IV), Zr(IV), Sn(IV) and Al(III), in the presence of a solvent and a surfactant.

11. The hydrophilic adjuvant of claim 10, wherein the solvent is one or more selected from the group consisting of ethanol, water, isopropyl alcohol, methanol and ethyl acetate.

12. The hydrophilic adjuvant of claim 10, wherein the surfactant is a nonionic surfactant represented by Formula 3 or an ionic surfactant represented by Formula 4:

$$EO_xPO_yEO_x \quad \text{[Formula 3]}$$

wherein x=5-40%, y=90-20%, 2x+y=100%, EO=ethylene oxide, and PO=propylene oxide; and $$(C_nH_{2n+1})(CH_3)_3NX_1 \quad \text{[Formula 4]}$$

wherein n=12-18, and $X_1$=Cl or Br.

13. The hydrophilic adjuvant of claim 1, further comprising a silane coupling agent.

14. The hydrophilic adjuvant of claim 13, further comprising a multifunctional organic compound represented by Formula 6:

$$R^3(EO)_kR^4 \quad \text{[Formula 6]}$$

wherein EO is ethylene oxide, k is an integer of 3-400, $R^3$ is selected from among OH, $C_1$-$C_{15}$ (meth)acrylate, $C_1$-$C_{15}$ di(meth)acrylate, $C_1$-$C_{15}$ tri(meth)acrylate and $C_1$-$C_{15}$ vinyl, and $R^4$ is selected from among hydrogen, $C_1$-$C_3$ (meth)acrylate and $C_1$-$C_3$ vinyl.

15. The hydrophilic adjuvant of claim 14, wherein the silane coupling agent, the multifunctional organic compound, or both, is bound to the composite metal oxide.

16. The hydrophilic adjuvant of claim 1, which is used as one component of a coating solution to be coated on a substrate.

17. The hydrophilic adjuvant of claim 1, which is used as one component of a film formulation in a film forming process.

18. A substrate having a coating layer formed using a hydrophilic adjuvant set forth in claim 1.

19. The substrate of claim 18, which has anti-fog performance due to the hydrophilic adjuvant.

20. The substrate of claim 18, which is an optical lens.

21. An electrolyte membrane in which a hydrophilic adjuvant set forth in claim 1 is used as one component of a coating solution for forming an electrolyte membrane or as one component of an electrolyte membrane-forming formulation.

22. The electrolyte membrane of claim 21, which is an electrolyte membrane for fuel cells.

23. An electrolyte for fuel cells, which contains a hydrophilic adjuvant set forth in claim 1, and an electrode catalyst.

* * * * *